(12) United States Patent
Zhao et al.

(10) Patent No.: US 8,014,785 B2
(45) Date of Patent: Sep. 6, 2011

(54) METHOD AND SYSTEM FOR COLLECTING AND REPORTING INTERFERENCE SOURCE INFORMATION

(75) Inventors: Quanbo Zhao, Shenzhen (CN); Zhong Pan, Shenzhen (CN); Xuyong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 738 days.

(21) Appl. No.: 12/048,498

(22) Filed: Mar. 14, 2008

(65) Prior Publication Data

US 2008/0161009 A1   Jul. 3, 2008

Related U.S. Application Data

(63) Continuation of application No. PCT/CN2006/002293, filed on Sep. 6, 2006.

(30) Foreign Application Priority Data

Oct. 25, 2005  (CN) ........................ 2005 1 0114711

(51) Int. Cl.
*H04W 72/00* (2009.01)
(52) U.S. Cl. ............... 455/452.2; 455/434; 455/436; 455/439; 455/67.11
(58) Field of Classification Search ............... 455/452.2, 455/439, 438, 3.01, 67.11
See application file for complete search history.

(56) References Cited

U.S. PATENT DOCUMENTS

| 5,048,015 | A | 9/1991 | Zilberfarb | |
| 6,937,617 | B2 * | 8/2005 | Rakib et al. | 370/485 |
| 7,668,928 | B2 * | 2/2010 | Newnam et al. | 709/216 |
| 2004/0166860 | A1 * | 8/2004 | Neufeld et al. | 455/437 |
| 2005/0054367 | A1 | 3/2005 | Larsson et al. | |
| 2005/0197126 | A1 * | 9/2005 | Kang et al. | 455/442 |

FOREIGN PATENT DOCUMENTS

| EP | 1330137 A1 | 7/2003 |
| WO | WO 03/094564 A1 | 11/2003 |
| WO | WO 2004/093478 A1 | 10/2004 |
| WO | WO 2005/091667 A1 | 9/2005 |

OTHER PUBLICATIONS

Extended European Search Report in counterpart European Application No. 06790948.1-2412, mailed Sep. 10, 2010.
Written Opinion in counterpart PCT Application No. PCT/CN2006/002293, mailed Dec. 28, 2006.

(Continued)

*Primary Examiner* — Dai A Phuong
(74) *Attorney, Agent, or Firm* — Leydig, Voit & Mayer, Ltd.

(57) ABSTRACT

Method, and system for collecting and reporting interference source information, the method includes: each terminal receives broadcast message containing NBS identification information sent by NBS when initializing, terminals which can demodulate and check accurately contain the broadcast message and receiving time information in interfered reporting message and send the interfered reporting message to the operating base station OBS, and terminals which can't demodulate and check in error contain receiving time information in reporting message; OBS records the receiving time information reported by each terminal, and records the NBS identification information contained in the broadcast message reported by terminals which check accurately as the interference source of the terminals which report the broadcast message; then, searches and records the interference sources for the other terminals from the recorded interference sources according to the relationship between the receiving time information.

20 Claims, 10 Drawing Sheets

OTHER PUBLICATIONS

"Part 16: Air Interface for Fixed Broadband Wireless Access Systems—Amendment for Improved Coexistence Mechanisms for License-Exempt Operation," *IEEE*, IEEE Standard No. 802.16h-05/017, Aug. 15, 2005.

"Draft IEEE Standard for Local and metropolitan area networks: Part 6: Air Interface for Fixed Broadband Wireless Access Systems," *IEEE*, IEEE Standard No. P802.16-REVd/D5-2004 (Draft Revision of IEEE Standard No. 802.16/2001; IEEE Standard No. 802.16c™-2002, and IEEE Standard No. 802.16a™-2003), May 13, 2004.

"Call for Contributions—IEEE 802.16 License-Exempt Task Group," *IEEE*, No. IEEE 802.16h-05/018, Aug. 18, 2005.

1st Office Action in corresponding European Application No. 06790948.1 (Feb. 17, 2011).

* cited by examiner

| Start of Frame (SOF) | Payload (IP Address) | CRC (CHECK) | End of Frame (EOF) |
|---|---|---|---|

Figure 3

METHOD AND SYSTEM FOR COLLECTING AND REPORTING INTERFERENCE SOURCE INFORMATION

CROSS-REFERENCE TO RELATED APPLICATIONS

This application is a continuation of International Patent Application No. PCT/CN2006/002293, filed Sep. 6, 2006, which claims priority to Chinese Patent Application No. 200510114711.2, filed Oct. 25, 2005, both of which are hereby incorporated by reference.

FIELD OF THE INVENTION

The present invention relates to the broadband wireless access technology, in particular, to a method, system and terminal for collecting and reporting interference source information for a terminal in a coexistence system.

BACKGROUND OF THE INVENTION

With the rapid development of Broadband Wireless Access (BWA) technology, the technology for broadband metropolitan area access using wireless resources finds a strong vitality and a broad market space. At the same time, wireless spectrum resources are very precious. Especially for some areas that are not well planned or some license-exempt frequency bands, a plurality of Base Stations (BS) usually runs on the same channel. As a result, the systems which home to these BSs may interfere with each other. Therefore, for the coexistence of devices under the same frequency band, especially the coexistence of devices under license-exempt frequency bands, some coexistence mechanisms among devices needs to be established.

It should be noted that Neighbor BSs in the context refer to Base Stations that have a common coverage area in which one or more effective terminals exist. As shown in FIG. 1, BS1 and BS2 are near to each other geographically and lie in each other's coverage area, respectively, but because there is not any effective terminal in the common coverage area of stations BS1 and BS2 and the wireless networks of two parties do not interfered severely with each other, stations BS1 and BS2 are not referred to as Neighbor BSs. However, although the overlap area between BS2 and BS3 is small and both do not lie in each other's coverage area, there are effective terminals in the overlapped coverage area and the wireless networks of two parties interfere with each other, so BS2 and BS3 are referred to as Neighbor BSs.

In a coexistence system, it is usually required that the frame timing for transmitting and receiving a signal among BSs should be aligned rigidly so that BSs that are near to each other geographically would not interfere with each other on signals receiving and transmitting. For example, for BS1 and BS2 shown in FIG. 1, if BS2 is receiving a signal when BS1 is transmitting a signal, BS1 will interfere with BS2 on receiving signals from its subordinate terminals. Therefore, receiving/transmitting synchronization must be guaranteed among BSs.

The negotiation between Neighbor BSs is very important in solving the problem of coexistence. When air interface resources are allocated, the BS sends data to a terminals in an interference-free area using competitive air interface resource (such as time period, subchannel, etc), and sends data to a terminal in an interfered area using dedicated air interface resource (such as time period and sub channel).

An operating BS needs to know the interference state of a terminal all the time, and needs to know whether each terminal is interfered with and from which base stations the interference came. Moreover, when a new Neighbor BS nearby is started, the operating BS updates the interference information of the terminal.

As shown in FIG. 2, in the case that a BS near the coexistence BS is started up, during the initialization process for the SBS/IBS (wherein SBS refers to Startup Base Station, and IBS refers to Initializing Base Station), a WBS/OBS (wherein WBS refers to Working Base Station, and OBS refers to Operating Base Station) collects and notifies the SBS/IBS of information of interference state in which the SBS/IBS interferes with the local network. Specifically, the procedure includes the following steps.

1) An IBS broadcasts necessary information, such as IP address, to terminals of the neighboring network in the coverage area (such as SS_A, etc.) by sending an IPBC (IP Address Broadcast) message via an air interface.

2) In response to receiving this message, each terminal that received the message via the air interface carries the information contained in the received message and information containing the identity and state of the terminal in an interference report message via the air interface, and sends the interference report message to the OBS to which the terminal homes.

3) The OBS collects the information reported by each terminal, and updates a local coexistence information DB (Database) with the related information.

4) In response to updating the local coexistence information DB, the OBS sends, via a wired network, its contact information, identification, and the related information in the coexistence information DB to the IBS according to the IP address information of the IBS.

5) In response to receiving the information from the OBS via the wired network, the IBS obtains related information and updates its coexistence information DB;

6) The IBS obtains the IP address of the OBS from the message sent by the OBS and responds to the OBS according to the IP address, carrying other information of the IBS in the response message;

7) The OBS updates the DB according to the above other information carried in the message sent from the IBS, and then goes on with the subsequent processes.

According to the interference source information reported from all the terminals, the OBS may establish coexistence DB information which includes information of the Neighbor BS and information of the subordinate terminal. One example of the information of the coexistence DB is as shown in Table 1 and Table 2:

TABLE 1

List of information of the Neighbor BS in a coexistence DB

| BS Index | IP address | Other Information |
|---|---|---|
| 1 | XXX.XXX.XXX.XXX | ...... |
| 2 | XXX.XXX.XXX.XXX | ...... |
| ...... | ...... | ...... |

TABLE 2

List of information of the subordinate terminal in a coexistence DB

| Terminal number (such as basic CID) | Number of interference sources that have been found | Interference source 1 (Index) | Interference strength | Interference source 2 (Index) | Interference strength | ...... | Other state information |
|---|---|---|---|---|---|---|---|
| 1 | 2 | ...... | ...... | ...... | ...... | ...... | ...... |
| 2 | 1 | ...... | ...... | ...... | ...... | ...... | ...... |
| ...... | ...... | ...... | ...... | ...... | ...... | ...... | ...... |

The IBS in initialization state sends a broadcast message to the terminals belonging to the Neighbor BS in the coverage area via an air interface. The broadcast message includes the contact information of the IBS, such as IP address information or other information. The contact information must correspond to an IBS uniquely. As shown in FIG. 3, the broadcast message is sent frame by frame. The format of a frame includes SOF (Start of Frame), Payload, CRC (Cyclic Redundancy Check) and EOF (End of Frame), in which the Payload usually carries IP address information of the transmission BS, and the CRC is used for checking the integrity and correctness of a message. Taking a 32-bit address for IPv4 for example, the package may employ the format of SOF+32 bit IP Address+8 bit CRC+EOF.

A complete broadcast message may be sent in segments according to physical frame format, and only a part of the message is sent in each physical frame that meets the requirements. For example, as shown in FIG. 4, a block of a message is sent in every N frames starting from frame M, and totally n frames are sent. The n frames form a complete broadcast message frame. Terminals of the "same batch" in the coverage area of an IBS receive the above broadcast message frame simultaneously.

When a plurality of terminals exists in a common coverage area belonging to both of an IBS and an OBS, a part of the terminals that receive the broadcast signal may not be able to correctly receive a complete broadcast message due to the interference from other signals or other reasons. Therefore, the terminals may not correctly report the received message to the OBS to which they home. As a result, the OBS may not obtain and record the information of terminals the IBS interfered with.

SUMMARY OF THE INVENTION

The invention provides a method, a system and a terminal for collecting and reporting interference source information solving the problem that the reported interference source information cannot be collected when a terminal fails to receive the broadcast message from a newly started Neighbor BS.

To solve the above technical problem, the invention provides the following technical solutions.

A method for collecting and reporting interference source information includes the following steps.

Each terminal receives a broadcast message carrying Neighbor BS (NBS) identification information that is sent by an NBS, and a terminal that receives the broadcast message correctly carries the broadcast message and receiving time information in an interference report message and sends it to an OBS to which the terminal homes, while a terminal that receives the broadcast message incorrectly carries the receiving time information in an interference report message;

the OBS records the receiving time information reported by each terminal, and records the NBS identification information carried in the broadcast message reported by the terminal that receives the broadcast message correctly as an interference source identification of the terminal, and then determines, from the recorded interference sources, according to the association relationship of the receiving time information, an interference source identification of a terminal that does not report the broadcast message, and records the interference source identification.

In the method, the correct receiving includes demodulating the broadcast message and that the checking is passed. The incorrect receiving includes being unable to demodulate the broadcast message or that the checking is failed after demodulation.

In the method, the broadcast message is sent as one message block or is segmented in at least two message blocks to be sent according to the size of a time slot allocated for sending the broadcast message in the physical frame format.

If demodulation of the broadcast message can be implemented by a terminal, the terminal sends an interference report message once after it demodulates and checks the broadcast message.

If demodulation of the broadcast message can not be implemented by a terminal, the terminal sends an interference report message once at every time it receives a broadcast message block.

The receiving time information is a frame sequence number of a physical frame that includes a broadcast message block, or a receiving time of a broadcast message block.

If a broadcast message is segmented in at least two message blocks to be sent, the receiving time information reported by the terminal that can demodulate the broadcast message is a frame sequence number of a physical frame that includes one of the broadcast message blocks, or a receiving time of one of the broadcast message blocks.

The one of the broadcast message blocks refers to the first message block or the last message block of the broadcast message.

If the receiving time information is a frame sequence number of a physical frame, a method for determining the association relationship of the receiving time information is as follows.

The OBS computes the number of message blocks contained in a broadcast message according to the length of the broadcast message reported by the terminal in which the checking is passed.

If the number of message blocks contained in the broadcast message is equal to 1, it is determined that the association relationship exists if the frame sequence numbers reported by two terminals is equal to each other.

If the number of message blocks contained in the broadcast message is greater than 1, a set of frame sequence numbers corresponding to all the message blocks contained in the broadcast message is determined according to the frame sequence numbers reported by a terminal and the frame interval between physical frames that contain neighboring broadcast message blocks, and it is determined that the association relationship exists if a frame sequence number reported by a terminal that does not report the broadcast message is contained in the set of sequence numbers.

If the receiving time information is the receiving time of a message block, the method for determining the association relationship is as follows.

The OBS computes the number of message blocks contained in a broadcast message according to the length of the broadcast message reported by the terminal in which the checking is passed.

If the number of message blocks contained in the broadcast message is equal to 1, it is determined that the association relationship exists if the receiving time reported by two terminals is equal to each other or if a difference value between the receiving time is within a predefined threshold.

If the number of message blocks contained in the broadcast message is greater than 1, a time range for receiving all the message blocks contained in the broadcast message is determined according to the receiving time reported by a terminal and the difference value between the time for receiving neighboring broadcast message blocks, and it is determined that the association relationship exists if a receiving time reported by a terminal that does not report the broadcast message is contained in the time range or if the difference between the receiving time and the end value of the time range is within a predefined threshold.

The method further includes: the OBS returns interference source information for a terminal that makes an incorrect receiving, which is determined according to the association relationship, to the terminal, for instructing the terminal to discard the broadcast message from the corresponding NBS.

The method further includes: the OBS updates a coexistence database (DB) with the interference source information for each terminal.

The method further includes: the OBS returns its identification information and the OBS-related information recorded in the coexistence DB to the NBS.

The identification information is IP address information.

In the method, the terminal performs correctness check with the CRC code carried in the broadcast message.

In the method, receiving incorrectness indication information is also carried in the report message by the terminal in which the checking is failed.

The incorrectness indication information further includes a value of reason that causes the broadcast message to be received incorrectly.

A system for collecting and reporting interference source information, which includes at least one terminal device and a base station (BS) to which the at least one terminal device homes.

The terminal device includes a broadcast message receiving unit, a broadcast message processing unit and an interference report message sending unit. The broadcast message receiving unit receives a broadcast message carrying Neighbor BS (NBS) identification information that is sent by an NBS of the OBS to which broadcast message receiving unit homes. The broadcast message processing unit generates an interference report message carrying the broadcast message and receiving time information after receiving the broadcast message correctly, otherwise, it generates an interference report message carrying receiving time information, and the interference report message is sent to the OBS via the interference report message sending unit.

The BS to which the terminal homes includes an interference report message receiving unit and an interference report message processing unit. The interference report message receiving unit receives the interference report message sent by each terminal; the interference report message processing unit records, as an interference source identification of the terminal, the NBS identification information carried in the broadcast message reported by a terminal that makes a correct receiving, and determines, from the recorded interference sources, an interference source identification of a terminal that does not report the broadcast message, according to the association relationship for the information of receiving time when the NBS broadcast message, reported by each terminal, is received.

Preferably, the broadcast message processing unit includes:

a receiving time determining subunit, which is communicated to the broadcast message receiving unit, for determining the receiving time of the broadcast message;

a demodulating subunit, which is communicated to the broadcast message receiving unit, for demodulating the broadcast message;

a checking subunit, which is communicated to the demodulating subunit, for checking the demodulated broadcast message;

an interference message generating subunit, which is communicated to the receiving time determining subunit, the demodulating subunit, the checking subunit and the interference report message sending unit respectively, for generating an interference report message carrying the broadcast message and receiving time information when the broadcast message can be demodulated and the checking is passed, and for generating an interference report message carrying receiving time information when the broadcast message cannot be demodulated or the checking is failed after demodulation.

Preferably, the interference report message processing unit includes:

a receiving time extracting subunit, for extracting receiving time information of an NBS broadcast message carried in the interference report message reported by each terminal device, and recording, as an interference source identification of the terminal, the IBS identification information carried in the broadcast message reported by a terminal in which the checking is passed;

an association relationship determining subunit, for determining, from the recorded interference sources, an interference source identification for a terminal that does not report the broadcast message, according to the association relationship of the receiving time information.

Moreover, the interference report message processing unit further includes: a coexistence DB, which is communicated to the receiving time extracting subunit and the association relationship determining subunit respectively, for saving the interference source identification information of each terminal.

The invention further provides a terminal device and a base station (BS) described above.

The technical solutions of the invention have the following beneficial effects.

A time identification is set in an interference source message reported by a terminal, so that for the same batch of terminals that are interfered by an IBS, so long as a part of the terminals can correctly receive the broadcast message from the interference source and report the interference source information to the OBS, the OBS may determine, according to the association relationship of the time identifications, the interference information for a terminal that does not correctly receive the broadcast message. Therefore, the success ratio for an Neighbor BS to correctly determine the interfered terminal state via a single broadcast message of the newly started BS may be improved, and the missing probability for a BS to collect the interference information of its subordinate terminals after the terminal receives the broadcast message incorrectly due to accidental causes or interference may be lowered.

Even for some terminals that cannot correctly receive and demodulate an air interface-dedicated broadcast message, the BS can also determine the interference state and interference source for the terminal according to the information reported from other terminals so long as the interference state of the air interface can be monitored in a specific time range and reported by the terminals as required. Therefore, the minimum requirement on the modification of a device for realizing coexistence may be lowered, and it is convenient to be compatible with various terminals in the transition period.

BRIEF DESCRIPTION OF THE DRAWINGS

FIG. 3 is an example of a dedicated frame format of an NBS broadcast message carrying coexistence information;

DETAILED DESCRIPTION OF THE EMBODIMENTS

In the method of the invention, if a plurality of terminals exists in a common coverage area of an NBS (including SBS/IBS and WBS/OBS) and an OBS, and a part of the terminals homing to the NBS in the common coverage area cannot receive a broadcast message completely and correctly due to interference or cannot demodulate the received broadcast message, the terminals homing to the NBS send receiving time information to the OBS, and the OBS determines, from the interference source information reported by other terminals, the interference source information for the terminals according to the association relationship between the interference time information and records the interference source information.

Figure 1:
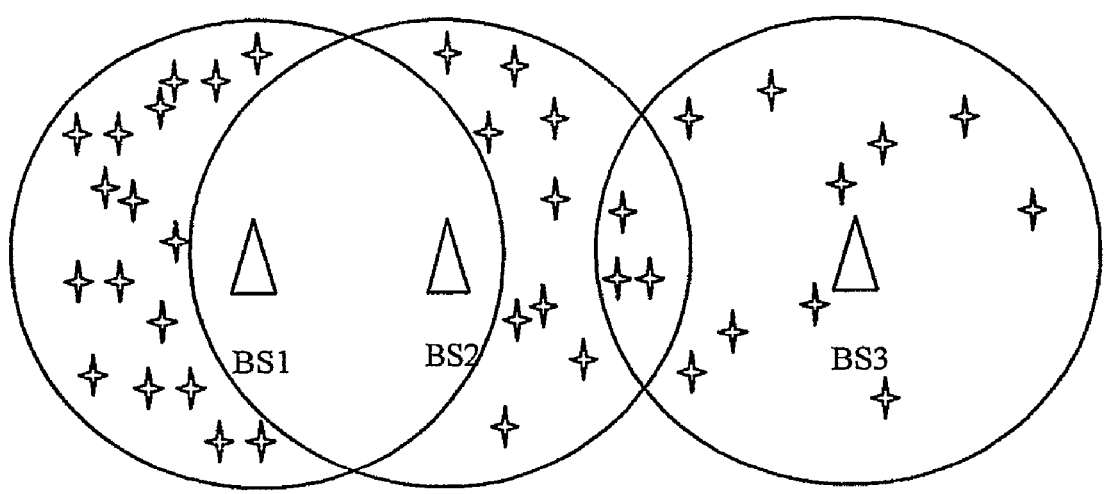
FIG. 1 is a schematic diagram of a Neighbor BS.
Figure 2:
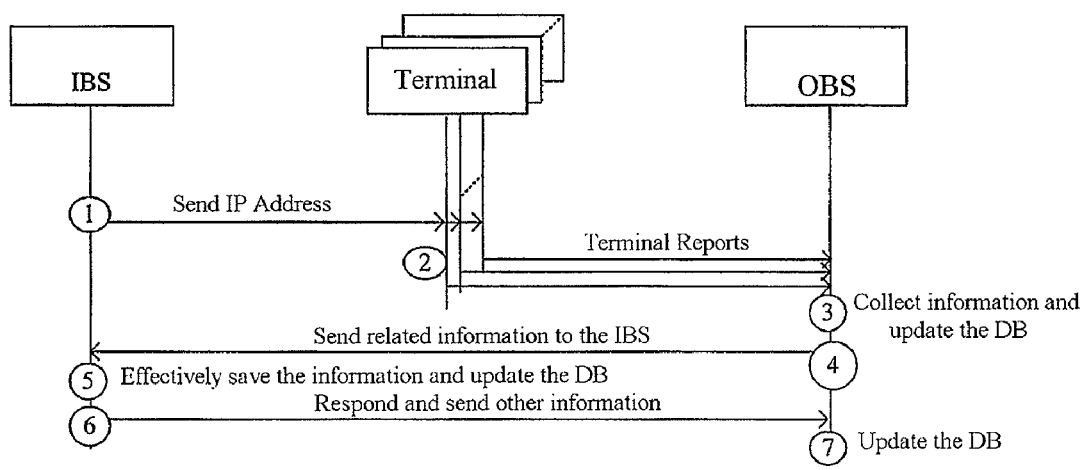
FIG. 2 is a schematic diagram illustrating a procedure in which an OBS collects the state of a local terminal interfered by an IBS and interacts with the IBS.
Figure 4:
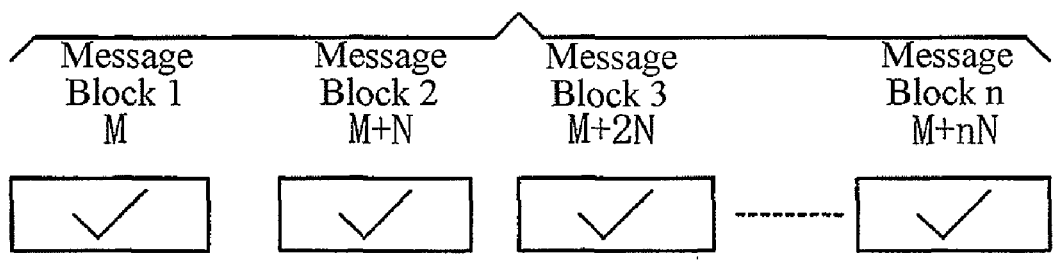
FIG. 4 is a schematic diagram illustrating the process in which a broadcast message is sent frame by frame.
Figure 5:
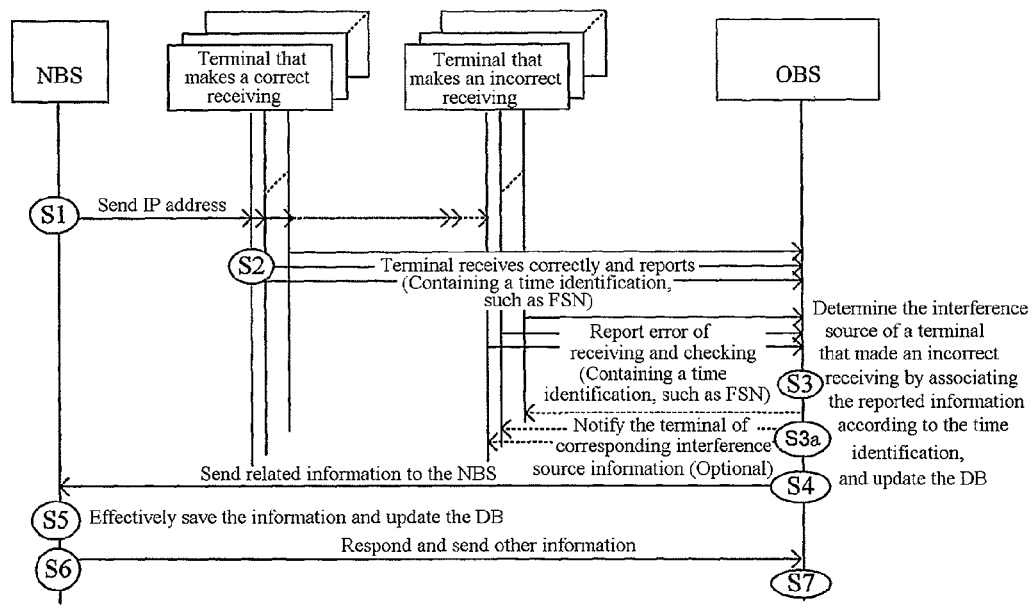
FIG. 5 is a schematic diagram illustrating a procedure in which an OBS collects the state of a local terminal interfered by an IBS and interacts with the IBS according to the present invention.

FIG. 5 shows the procedure in which the OBS, NBS and terminals of the SS exchange interference source information for the terminals according to the invention, which includes the following steps:

S1: The NBS broadcasts IP address information in the form of a physical frame format to the terminals in the coverage area via an air interface. The broadcast message may be sent, in physical frames, as one message block or a plurality of segmented message blocks according to the size of a time slot allocated for sending the broadcast message in a physical frame, and each physical frame only carries one message block.

S2: A terminal in the NBS coverage area receives the broadcast message, block by block, via an air interface, and performs the following operations: a terminal that can demodulate the broadcast message frame determines whether a complete message is received and checks the correctness of the message, and if the checking is passed, the terminal records the complete message and the starting time identification of the received first message block. If the terminal cannot demodulate the broadcast message frame or the terminal can demodulate the broadcast message frame but the checking is failed, the terminal records a message receiving incorrectness indication and the starting time identification of the received first message block, and carries the recorded information and the information of the identity and state of the terminal in an interference report message and sends, via the air interface, the interference report message to the OBS to which the terminal homes.

To achieve the purpose of the invention, if a terminal can demodulate the broadcast message, the terminal sends an interference report message after it demodulates and checks a broadcast message. If a terminal cannot demodulate the broadcast message, the terminal sends an interference report message every time it receives a broadcast message block, and discards the received broadcast message block.

When the broadcast message is sent in one message block, the receiving time information may be a frame sequence number of the physical frame containing the broadcast message block that is received by the terminal, or a receiving time reported by the terminal that receives the broadcast message block.

When the broadcast message is sent in the form of at least two segmented message blocks, the time information recorded and reported by a terminal that can demodulate the broadcast message is a frame sequence number of the physical frame that includes one of the broadcast message block, or the receiving time when one of the broadcast message blocks is received. Usually, a convenient method is to select and record the first or the last message block.

Incorrectness indication may be identified by carrying a specific value of message (such as reporting a specific IP address) or setting a flag bit in the reported frame format, such as Error-flag=1.

The check code contained in the message may be a CRC or a parity check code and so on. The terminal checks the integrity and correctness of a message with the check code, and may also report specific incorrectness type information after receiving incorrectness is identified. The type of incorrectness usually includes that no correct start flag of frame is received, no correct end flag of frame is received, frame length is inaccurate and CRC checking for message content is failed and so on. The incorrectness type information may be reported by carrying a set value of cause.

S3: The OBS to which the terminal homes collects the information reported by each terminal, determines the interference source of a terminal that made an incorrect receiving by associating the reported information according to the time identification, and updates a local coexistence data base (DB) with related information.

According to the information report record about the coexistence BSs that is received in a time period (such as a set period for coexistence data updating, or a set time period starting from the time when the first report message is received), the OBS directly records the interference information (for example, interference source IP and so on) for a terminal from the information that is reported by the terminal and is indicated as correct (for example, Error-flag=0); and for the information that is reported by a terminal and is indicated as incorrect (for example, Error-flag=1), the OBS searches for the same information report record or the information report record that is indicated as correct in an effective range, so that the interference source for the terminal may be determined.

The effective range refers to a range of sequence numbers for all the physical frames related to a broadcast message or receiving duration for receiving all the physical frames. The determination of the effective range is used for determining whether an association relationship exists. If the receiving time information is a sequence number of a physical frame, the effective range is a set of frame sequence numbers of all the message blocks in which the broadcast message is contained. The method for determining the association relationship includes the following steps:

1) The OBS computes the number of message blocks contained in a broadcast message according to the length of the broadcast message reported by a terminal in which checking is passed. If the number of the message blocks is 1, step 4 is processed; otherwise, go on with step 3.

2) A set of frame sequence numbers corresponding to all the message blocks contained in the broadcast message is determined according to the frame sequence numbers reported by a terminal and the frame interval between physical frames that contain neighboring broadcast message blocks.

3) It is determined that the association relationship exists if a frame sequence number reported by a terminal that does not report the broadcast message is contained in the set of sequence numbers.

4) If the frame sequence numbers reported by two terminals are equal to each other, it is determined that the association relationship exists.

If the receiving time information is the receiving time of a message block, the effective range is the duration for receiving all the message blocks contained in the broadcast message. If the difference between the time when different terminals receive the broadcast message is considered, the method for determining the association relationship includes the following steps:

1) The OBS computes the number of message blocks contained in the broadcast message according to the length of the broadcast message reported by the terminal in which the checking is passed, when the number of the message blocks is 1, step 4 is processed; otherwise, go on with step 2.

2) A time range for receiving all the message blocks contained in the broadcast message is determined according to the receiving time reported by a terminal and the difference value between the time for receiving neighboring broadcast message blocks.

3) It is determined that the association relationship exists if a receiving time reported by a terminal that does not report the broadcast message is contained in the time range or if the difference between the receiving time and the end value of the time range is within a predefined threshold.

4) It is determined that the association relationship exists if the receiving time reported by two terminals is equal to each other or if a difference value between the receiving time is within a predefined threshold.

According to the above determination method, even for some terminals that cannot correctly receive and demodulate an air interface-dedicated broadcast message, the BS can also determine the interference state and interference source for the terminal according to the information reported from other terminals so long as the interference state of the air interface can be monitored in a specific time range and reported by the terminals as required. Therefore, the minimum requirement on the modification of a device for realizing coexistence may be lowered, and it is convenient to be compatible with various terminals in the transition period.

Moreover, the method may also include a step S3a, in which a feedback message is sent, via an air interface, to a corresponding terminal that does not report the broadcast message, for notifying the terminal of interference source information that is determined according to the association relationship. When the terminal receives a broadcast message from the same NBS again after receiving the feedback message, the terminal will discard this broadcast message and do not report it, so that upstream bandwidth will be saved.

S4: After updating the local coexistence information DB, the OBS sends, via a wired network, its IP address, identification, and the related information in the DB to the IBS according to the IP address information of the NBS reported by the terminal.

S5: After receiving the information from the OBS via the wired network, the NBS obtains related portion and updates its coexistence information DB.

S6: The NBS obtains the IP address of the OBS from the message sent by the OBS and responds to the OBS according to the IP address, carrying other information of the NBS in the response messages sent to the OBS.

S7: The OBS updates the DB according to the above other information carried in the message sent from the NBS, and then goes on with the subsequent processes.

Figure 6:
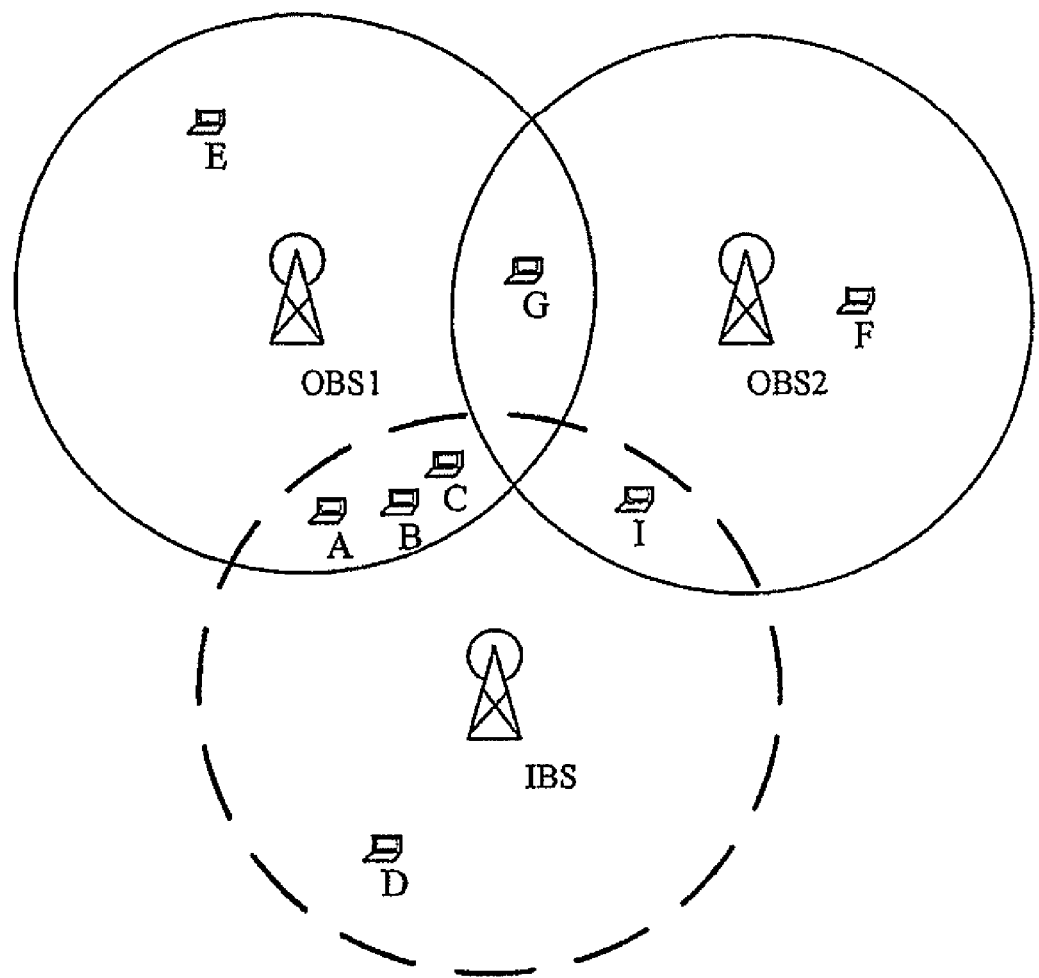
FIG. 6 is a schematic diagram of a system according to Embodiment 1.

As shown in FIG. 6, an IBS faces a plurality of BSs near to the IBS geographically, such as OBS1, OBS2. The OBS1, OBS2 and IBS are Neighbor BSs. Terminals A, B and C exist in the common coverage area of the OBS1 and IBS, terminal I exists in the common coverage area of the OBS2 and IBS, and terminal G exists in the overlapped part of the coverage area of the OBS1 and OBS2, while other terminals D/E/F do not exist in the overlap area among the BSs.

Figure 7:
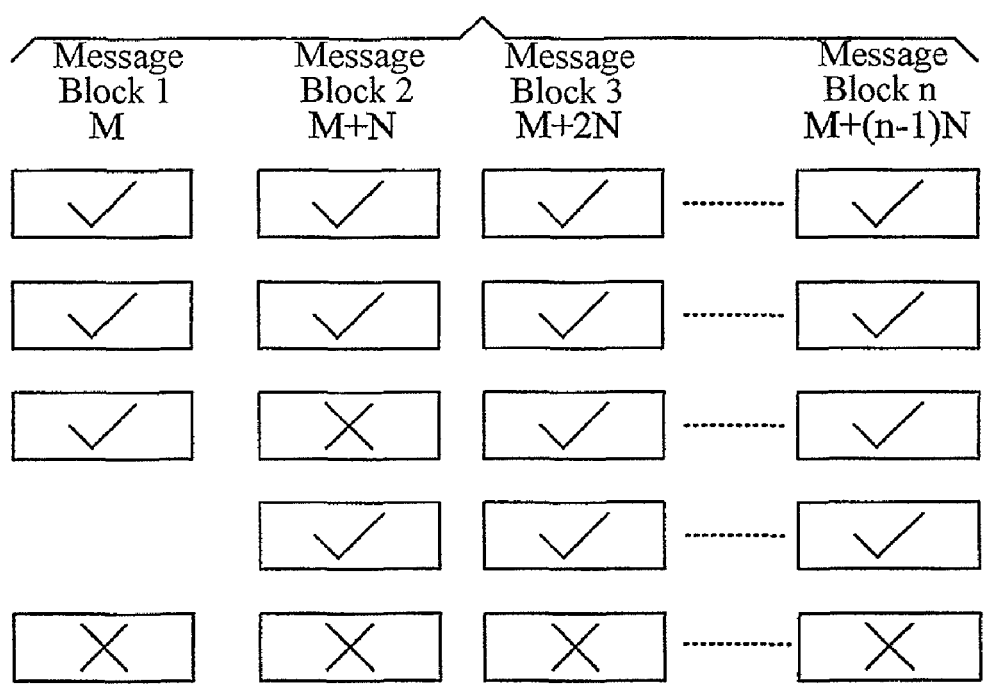
FIG. 7 is a schematic diagram illustrating various situations when the terminal according to Embodiment 1 receives a broadcast message frame by frame.

As shown in FIG. 7, it is a schematic diagram of the various situations where a terminal receives a broadcast message frame by frame. The first row represents the message blocks that are sent, and the other rows represent the receiving status. In FIG. 7, the check mark represents a correct receiving, the cross mark represents that error occurs in a receiving, while the missing part represents that the message block is lost. For example, the second row represents a complete and correct receiving, the second message block in the third row is received incorrectly, the first message block in the fourth row is not received, and the last row represents that the terminal cannot demodulate a dedicated broadcast message frame. The case that a terminal receives a broadcast message incorrectly may be an error in decoding or there is not a first message block correctly carrying a start flag. The terminal is only able to determine the interference information and report a message carrying correction indication after it decodes each message block correctly and completes the concatenating and checking. When an error occurs in decoding or part of the message blocks are not detected, only a message carrying incorrectness indication can be reported.

Still referring to FIG. 6 again, terminals A, B and C exist in the common coverage area of IBS and OBS1. For the broadcast message sent by the IBS during initialization, only terminal A receives the correct frame information, while terminals B and C receive the incorrect frame information. Error presented in terminal B corresponds to the incorrectness 1 shown in the above figure, and Error presented in terminal C corresponds to the incorrectness 2. Terminals A, B and C records the current time identification (such as the current FSN) indicating when the IBS broadcast message is received, and reports the Payload of the IBS broadcast information, the correctness or incorrectness flag, the time identification indicating when the IBS broadcast message is received (such as the current FSN), together with the information containing the identity and state of the terminal, to OBS1 to which the terminals home. The time identification recorded by the terminal may be an FSN that the terminal receives an SOF or an EOF, or a receiving time that the terminal receives the SOF or the EOF.

OBS1 records the information reported by terminals A, B and C. Table 3 shows an example in which the collected information is stored temporarily.

TABLE 3

Temporary storage table of information reported by a terminal

| Terminal Number (such as Basic CID) | Interference Source (such as IP Address) | Time Identification (such as FSN) | Correctness or Incorrectness Flag |
|---|---|---|---|
| A | aaa.bbb.ccc.ddd | **** | Ok |
| B | eee.fff.ggg.hhh | **** | NOk |
| C | iii.jjj.kkk.lll | **** | NOk |
| ...... | ...... | ...... | ...... |

In the above Table 3, the receiving correct or receiving incorrect flag that is set in the message reported to the OBS by the terminal may be a separate flag, such as a single bit identification or a multi-bit identification. For example, "1" represents Correct, "0" represents Incorrect; or, "11" represents Correct, 10 represents Incorrect. Or, other methods may be used for representation. For example, a contact address of the interference source may be used. For example, an IP address that cannot appear in the present table normally, such as 255.255.255.255, may be used for indicating the incorrectness. The OBS marks in Table 3 according to the identification information. For example, the OBS marks OK for the correct receiving, and marks NOK for the incorrect receiving. A terminal with the mark of OK updates the DB with interference source information directly; while for an item with the mark of NOK, the OBS looks up, in the temporary table, an interference source corresponding to an OK item that is the same as the item with the mark of NOK in time identification or an OK item of which the FSN meets the condition.

Association identification will be illustrated referring to FIG. 7, in which M represents a sequence number of the starting frame containing the first message block, N represents the number of frames between two message blocks, and n represents the number of message blocks occupied by a complete broadcast frame. The terminal performs recording the time of the first message block when makes a correct receiving and sends the FSN via a report message. Terminal A makes a correct receiving, so in the message sent by terminal A, FSN=M, which indicates that the checking is passed. Subsequently, OBS1 determines that the FSNs in all the report messages is respectively M, M+N, ..., M+(n−1)N, and indicates that the interference sources of the terminals which make an incorrectly receiving are all the same as that of the terminal A. For example, the FSN reported by terminal B is M and the FSN reported by terminal C is M+N, thus OBS1 may determine that the interference sources of terminals B and C that report incorrect messages are the same as that of terminal A. In other words, the FSN identifications of M, M+N, ..., M+(n−1)N are all associated with identification M. As a general rule, when receiving time is taken as the identification information, the receiving time of message blocks 1, 2 ... n are all associated time information. When other message blocks are selected to determine the receiving time information, the method for computing the associated time information is similar, so it will not be described here again.

Figure 8:
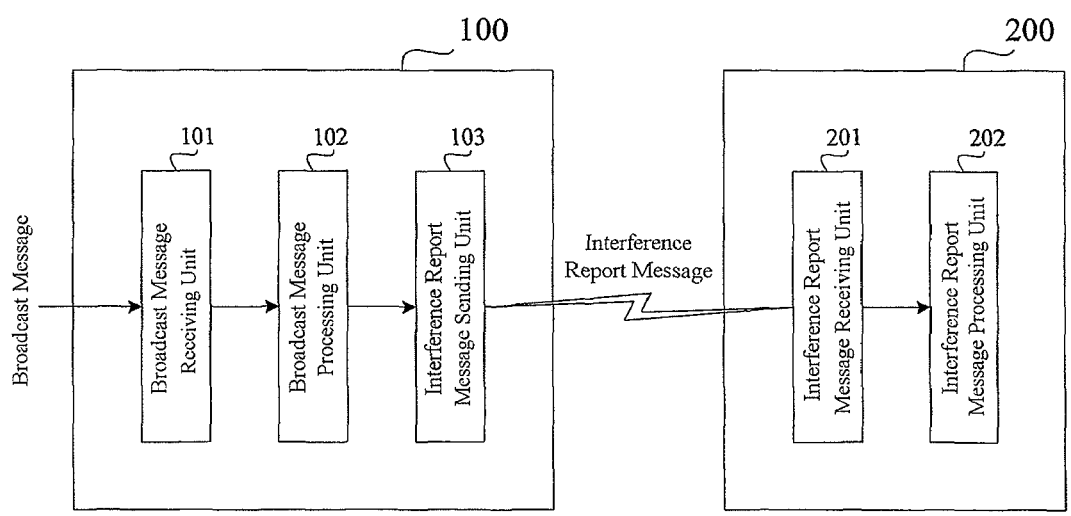
FIG. 8 is a schematic diagram illustrating a main structure of a system for collecting and reporting interference source information according to the invention, including the schematic diagram illustrating the main structure of the terminal device and BS according to the invention.

As shown in FIG. 8, on the basis of the above method, the invention further provides a system for collecting and reporting interference source information, which includes at least one terminal device 100 and a base station (BS) 200 to which each terminal device 100 homes.

The terminal device 100 includes a broadcast message receiving unit 101, a broadcast message processing unit 102 and an interference report message sending unit 103.

The broadcast message receiving unit 101 is configure to receive a broadcast message carrying NBS identification information that is sent by an NBS of the OBS to which the terminal homes.

The broadcast message processing unit 102 is configure to generate an interference report message carrying the broadcast message and the receiving time information after it determines that the broadcast message is received correctly (the broadcast message can be demodulated and the checking is passed), while generate an interference report message carrying receiving time information when it determines that the broadcast message is received incorrectly (the broadcast message cannot be demodulated or the checking is failed after demodulation), and send the interference report message to the OBS via the interference report message sending unit 103.

The BS 200 to which the terminal homes includes an interference report message receiving unit 201 and interference report message processing unit 202.

The interference report message receiving unit 201 is configure to receive interference report message sent by each terminal.

The interference report message processing unit 202 records, as an interference source identification of the terminal, the NBS identification information carried in the broadcast message reported by a terminal that makes a correct receiving, and determines, from the recorded interference sources, an interference source identification of a terminal that does not report the broadcast message, according to the association relationship for the information of receiving time when the NBS broadcast message, reported by each terminal, is received.

Figure 9:
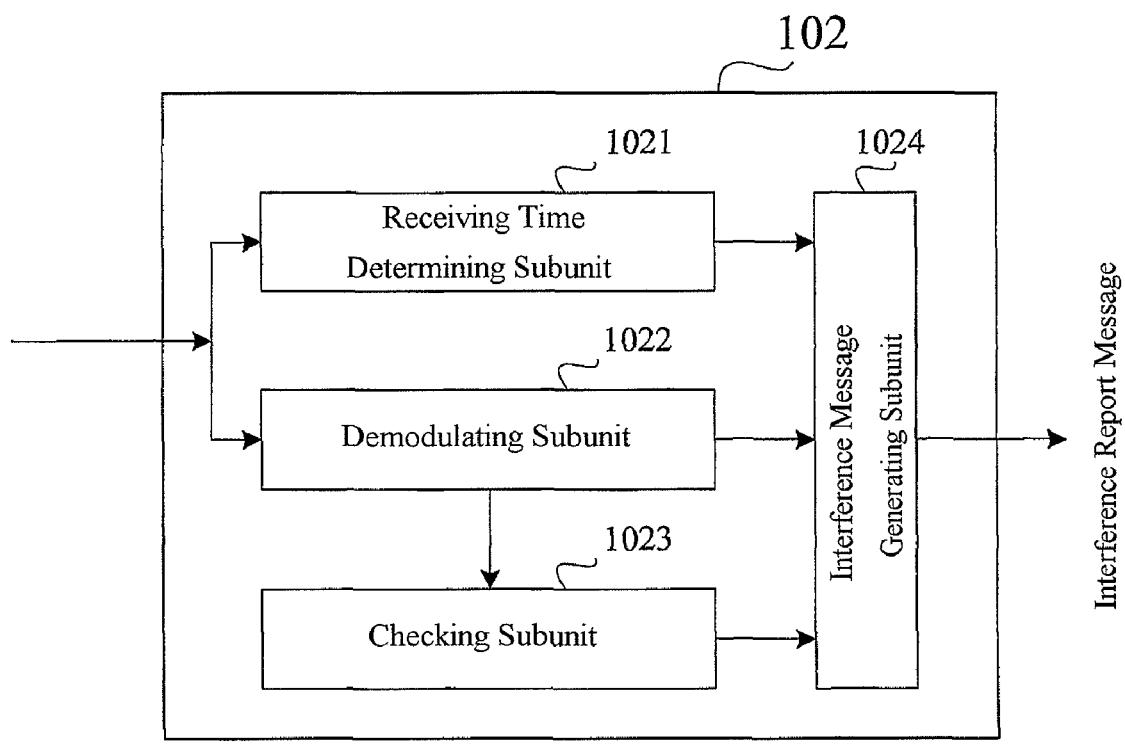
FIG. 9 is a schematic diagram illustrating a specific structure of the broadcast message processing unit in the terminal device shown in FIG. 8.

As shown in FIG. 9, a structure of the broadcast message processing unit 102 may specifically include:

a receiving time determining subunit 1021, which is communicated to the broadcast message receiving unit 101, for determining the receiving time of a broadcast message;

a demodulating subunit 1022, which is communicated to the broadcast message receiving unit 101, for demodulating the broadcast message;

a checking subunit 1023, which is communicated to the demodulating subunit 1022, for checking the demodulated broadcast message;

an interference message generating subunit 1024, which is communicated to the receiving time determining subunit 1021, the demodulating subunit 1022, the checking subunit 1023 and the interference report message sending unit 103 respectively; the receiving time determining subunit 1021 determines the receiving time and sends it to the interference message generating subunit 1024; the demodulating subunit 1022 sends a trigger signal to the interference message generating subunit 1024 when it cannot demodulate the broadcast message; the checking subunit 1023 sends a corresponding trigger signal to the interference message generating subunit 1024 after the checking is passed or is failed;

The interference message generating subunit 1024 may generate an interference report message carrying the broadcast message and receiving time information when the broadcast message can be demodulated and the checking is passed, and may generate an interference report message carrying receiving time information when the broadcast message cannot be demodulated or the checking is failed after demodulation.

Figure 10:
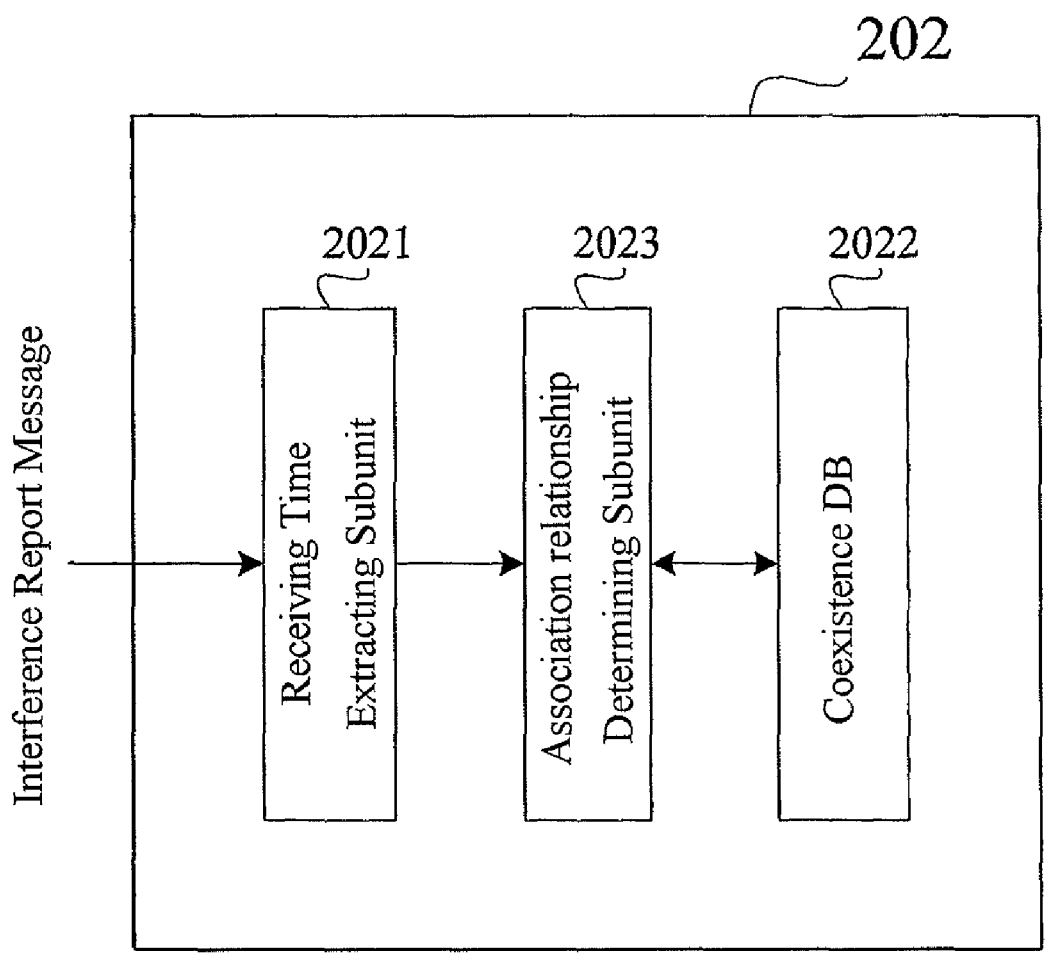
FIG. 10 is a schematic diagram illustrating a specific structure of the interference report message processing unit in the BS shown in FIG. 8.

As shown in FIG. 10, a structure of the interference report message processing unit 202 may include:

a receiving time extracting subunit 2021, for extracting the receiving time information of the NBS broadcast message carried in the interference report message reported by each terminal device, and recording, as an interference source identification of the terminal, the IBS identification information carried in the broadcast message reported by a terminal in which the checking is passed;

an association relationship determining subunit 2022, for determining, from the recorded interference sources, an interference source identification for a terminal that does not report the broadcast message, according to the association relationship of the receiving time information;

coexistence data base (DB) 2023, which is communicated to the receiving time extracting subunit 2021 and association relationship determining subunit 2022 respectively, for saving the interference source identification information of each terminal.

Apparently, various modifications and variations may be made by those skilled in the art without departing from the spirit and scope of the invention. Therefore, if modifications and variations of the invention are within the scope of the claims or the equivalent thereof, the invention is intended to include these modifications and variations.

The invention claimed is:

1. A method for collecting and reporting interference source information, comprising:
    receiving, by each terminal, a broadcast message carrying Neighbor BS (NBS) identification information that is sent by an NBS, sending, by a terminal that receives the broadcast message correctly, an interference report message carrying the broadcast message and receiving time information to an operating base station (OBS) to which the terminal homes, and sending, by a terminal that receives the broadcast message incorrectly, an interference report message carrying receiving time information;
    so as for recording, by the OBS, the NBS identification information carried in the broadcast message reported by the terminal that receives the broadcast message correctly as an interference source identification of the terminal, and determining, from the recorded interference sources, an interference source identification of the terminal that does not report the broadcast message, according to association relationship of receiving time information of the broadcast message, where the receiving time information is reported by each terminal.

2. The method according to claim 1, wherein the NBS comprises an IBS and an OBS, and the correct receiving of broadcast message indicates that the demodulating of the broadcast message and the checking are correct, while the incorrect receiving of broadcast message indicates that the demodulation of broadcast message or the checking after demodulation are incorrect.

3. The method according to claim 2, wherein the broadcast message is sent as one message block or at least two segmented message blocks according to the size of a time slot allocated for sending the broadcast message in a physical frame format; and
    if demodulation of the broadcast message can be implemented by a terminal, the terminal sends an interference report message once in response to the demodulating and checking the one broadcast message by the terminal;
    if demodulation of the broadcast message can not be implemented by a terminal, the terminal sends an interference report message in response to receiving a broadcast message block.

4. The method according to claim 1, wherein the receiving time information is a frame sequence number of a physical frame that includes a broadcast message block, or a receiving time of a broadcast message block.

5. The method according to claim 4, wherein, if a broadcast message is segmented in at least two message blocks to be sent, the receiving time information reported by the terminal that can demodulate the broadcast message is a frame sequence number of a physical frame that includes one of the at least two broadcast message blocks, or a receiving time of one of the at least two broadcast message blocks.

6. The method according to claim 5, wherein the one of the broadcast message blocks is a first message block of the broadcast message or a last message block of the broadcast message.

7. The method according to claim 4, wherein, if the receiving time information is a frame sequence number of a physical frame, the association relationship is determined, comprising:
    computing, by the OBS, the number of message blocks contained in a broadcast message, according to the length of the broadcast message reported by the terminal in which the checking is passed;
    determining that the association relationship exists if the number of message blocks contained in the broadcast message is equal to 1 and if the frame sequence numbers reported by two terminals is equal to each other;
    determining a set of frame sequence numbers corresponding to all the message blocks contained in the broadcast message according to the frame sequence numbers reported by a terminal and the frame interval between physical frames that contain neighboring broadcast message blocks, if the number of message blocks contained in the broadcast message is greater than 1, and determining that the association relationship exists, if a frame sequence number reported by a terminal that does not report the broadcast message is contained in the set of sequence numbers.

8. The method according to claim 4, wherein, if the receiving time information is the receiving time of a message block, the determination of the association relationship comprises:
    computing, by the OBS, the number of message blocks contained in a broadcast message, according to the length of the broadcast message reported by the terminal in which the checking is passed;
    if the number of message blocks contained in the broadcast message is equal to 1, determining, if the receiving time reported by two terminals is equal to each other or if a difference value between the receiving time is within a predefined threshold, that the association relationship exists;

if the number of message blocks contained in the broadcast message is greater than 1, determining, according to the receiving time reported by a terminal and the difference value between the time for receiving neighboring broadcast message blocks, a time range for receiving all the message blocks contained in the broadcast message, and determining, if a receiving time reported by a terminal that does not report the broadcast message is contained in the time range or if the difference between the receiving time and the end value of the time range is within a predefined threshold, that the association relationship exists.

9. The method according to claim 1, further comprising: returning, by the OBS, interference source information to a terminal that makes an incorrect receiving, which is determined according to the association relationship, to the terminal, for instructing the terminal to discard the broadcast message from the corresponding NBS.

10. The method according to claim 1, further comprising: updating, by the OBS, a coexistence database (DB) with the interference source information of each terminal.

11. The method according to claim 10, further comprising: returning, by the OBS, its identification information and the OBS-related information recorded in the coexistence DB to an IBS.

12. The method according to claim 2, wherein the identification information is IP address information; and the terminal performs correctness check according to a CRC (Cyclic Redundancy Check) code carried in the broadcast message.

13. The method according to claim 1, wherein the terminal, in which the checking is failed, reports the message carrying receiving incorrectness indication information.

14. The method according to claim 13, wherein the incorrectness indication information further comprises a value of reason that causes the broadcast message to be received incorrectly.

15. A terminal device, comprising a broadcast message receiving unit, a broadcast message processing unit and an interference report message sending unit;
the broadcast message receiving unit, configured to receive a broadcast message carrying Neighbor BS (NBS) identification information that is sent by an NBS of an operating base station (OBS);
the broadcast message processing unit, configured to generate an interference report message carrying the broadcast message and receiving time information in response to receiving the broadcast message correctly and send the interference report message to the OBS via the interference report message sending unit, and to generate an interference report message carrying receiving time information in response to receiving the broadcast message incorrectly and send the interference report message to the OBS via the interference report message sending unit.

16. The terminal device according to claim 15, wherein the broadcast message processing unit comprises:
a receiving time determining subunit communicated to the broadcast message receiving unit, configured to determining the receiving time of the broadcast message;
a demodulating subunit communicated to the broadcast message receiving unit, configured to demodulating the broadcast message;
a checking subunit communicated to the demodulating subunit, configured to checking the demodulated broadcast message;
an interference message generating subunit, which is communicated to the receiving time determining subunit, the demodulating subunit, the checking subunit and the interference report message sending unit respectively, configured to generating an interference report message carrying the broadcast message and receiving time information when the broadcast message can be demodulated and the checking is passed, and generating an interference report message carrying receiving time information when the broadcast message cannot be demodulated or the checking is failed after demodulation.

17. A base station (BS), comprising an interference report message receiving unit and an interference report message processing unit;
the interference report message receiving unit, configured to receive interference report messages sent by each terminal;
the interference report message processing unit, configured to record, as an interference source identification of a terminal, Neighbor BS (NBS) identification information carried in a broadcast message reported by the terminal that receives the broadcast message sent by an NBS correctly, and to determine, from the recorded interference sources, an interference source identification of a terminal that does not report the broadcast message, according to association relationship of receiving time information of the broadcast message, where the receiving time information is reported by each terminal.

18. The base station according to claim 17, wherein the interference report message processing unit comprises:
a receiving time extracting subunit, configured to extracting receiving time information of an NBS broadcast message carried in the interference report message reported by each terminal device, and recording, as an interference source identification of the terminal, the NBS identification information carried in the broadcast message reported by a terminal in which the checking is passed;
an association relationship determining subunit, configured to determining, from the recorded interference sources, an interference source identification for a terminal that does not report the broadcast message, according to the association relationship of the receiving time information.

19. The base station according to claim 18, wherein the interference report message processing unit further comprises a coexistence DB communicated to the receiving time extracting subunit and the association relationship determining subunit respectively, configured to saving the interference source identification information of each terminal.

20. A method of operating a base station (BS) comprising:
receiving interference report messages sent by each terminal;
recording, as an interference source identification of a terminal, Neighbor BS (NBS) identification information carried in a broadcast message reported by the terminal that receives the broadcast message sent by an NBS correctly, and to determine, from the recorded interference sources, an interference source identification of a terminal that does not report the broadcast message, according to association relationship of receiving time information of the broadcast message, where the receiving time information is reported by each terminal.

* * * * *